(12) United States Patent
Corghi

(10) Patent No.: US 10,514,323 B2
(45) Date of Patent: Dec. 24, 2019

(54) APPARATUS AND METHOD FOR ASSESSING VEHICLE WHEEL ALIGNMENT

(71) Applicant: Corghi S.p.A., Correggio (Reggio Emilia) (IT)

(72) Inventor: Giulio Corghi, Correggio (IT)

(73) Assignee: NEXION S.P.A., Correggio (Reggio Emilia) (IT)

( * ) Notice: Subject to any disclaimer, the term of this patent is extended or adjusted under 35 U.S.C. 154(b) by 276 days.

(21) Appl. No.: 15/459,115

(22) Filed: Mar. 15, 2017

(65) Prior Publication Data

US 2017/0284901 A1      Oct. 5, 2017

(30) Foreign Application Priority Data

Apr. 5, 2016 (IT) .......................... 102016000034855

(51) Int. Cl.
| | |
|---|---|
| *G01M 17/06* | (2006.01) |
| *G01B 5/255* | (2006.01) |
| *G01B 7/315* | (2006.01) |

(52) U.S. Cl.
CPC ............ *G01M 17/06* (2013.01); *G01B 5/255* (2013.01); *G01B 7/315* (2013.01); *G01B 2210/20* (2013.01)

(58) Field of Classification Search
CPC ....... G01M 17/06; G01B 5/255; G01B 7/315; G01B 2210/20
See application file for complete search history.

(56) References Cited

U.S. PATENT DOCUMENTS

| | | | |
|---|---|---|---|
| 1,808,287 A | * 6/1931 | Casler | .................... G01B 5/255 33/203.14 |
| 4,161,058 A | 7/1979 | Sasaki | |

(Continued)

FOREIGN PATENT DOCUMENTS

| | | | |
|---|---|---|---|
| DE | 19951290 A1 | | 4/2001 |
| JP | 3699155 | * | 9/2005 |

(Continued)

OTHER PUBLICATIONS

1 International Search Report dated Nov. 29, 2016.

*Primary Examiner* — Eric S. McCall
*Assistant Examiner* — Timothy P Graves
(74) *Attorney, Agent, or Firm* — The Dobrusin Law Firm P.C.

(57) ABSTRACT

A method for the diagnostic assessment of the wheel alignment of a vehicle (2) equipped with wheels (3) having tyres (301) coupled to respective rims (302), comprises the following steps: in a longitudinal movement of the vehicle (2) in a forward travel direction with one wheel (3) on a longitudinal track (4A), until the wheel (3) surmounts a measuring platform (5A) located along the track (4A), acquiring a forward travel measurement signal, representing a lateral force applied to the platform and directed transversely to both the longitudinal direction and the weight force at a forward travel instant at which the wheel surmounts the measuring platform (5A) as it moves along the track (4A) in the forward travel direction; in a longitudinal movement of the vehicle (2) in a return travel direction opposite to the forward travel direction with the wheel (3) on the track (4A), until the wheel (3) surmounts the measuring platform (5A), acquiring a return travel measurement signal, representing a lateral force applied to the platform (5A) and directed transversely at a return travel instant at which the wheel (3) surmounts the measuring platform (5A) as it (Continued)

moves along the track (4A) in the return travel direction; processing the forward and return measurement signals in order to determine, for the wheel (3), at least an angle of camber and/or toe.

14 Claims, 4 Drawing Sheets

(56) References Cited

U.S. PATENT DOCUMENTS

| | | | | |
|---|---|---|---|---|
| 5,522,144 A | * | 6/1996 | Smoorenburg | G01B 5/255 33/203.12 |
| 7,043,396 B2 | | 5/2006 | Larson et al. | |
| 7,415,770 B2 | * | 8/2008 | Naruse | G01B 21/26 33/203.12 |

FOREIGN PATENT DOCUMENTS

| | | |
|---|---|---|
| JP | 3699155 B2 | 9/2005 |
| JP | 2006234774 | 7/2006 |

\* cited by examiner

APPARATUS AND METHOD FOR ASSESSING VEHICLE WHEEL ALIGNMENT

BACKGROUND OF THE INVENTION

This invention relates to a method and an apparatus for assessing the wheel alignment of a vehicle. In particular, the invention addresses vehicles equipped with wheels having tyres coupled to corresponding rims.

More specifically, this invention relates to a method and an apparatus for the diagnostic assessment of the wheel alignment of a vehicle. In particular, the invention addresses vehicles equipped with wheels having tyres coupled to corresponding rims.

Assessment of vehicle wheel alignment involves deriving characteristic wheel angles such as (the angles of) toe and camber.

To derive the angles of toe and camber of the wheels of a vehicle, systems are known which are based on the processing of images of the wheels or of targets fixed to the wheels, to calculate the position of the wheels in space, or based on direct measurements of wheel position, for example using mechanical sensors.

U.S. Pat. No. 7,415,770B2 describes a correlation between the alignment of vehicle wheels and the lateral forces generated on the wheel supporting rollers in a vehicle lift.

U.S. Pat. No. 7,043,396 describes a platform surmountable by a wheel and configured to measure a force transmitted laterally of the platform when the wheel passes over the platform, in order to obtain additional information, relative to a tyre footprint pressure measurement.

The need remains, however, for tyre service specialists to have a simple, reliable system for quickly assessing the wheel toe and camber angles and, if necessary, other wheel alignment parameters, without resorting to complicated measurements of wheel position.

SUMMARY OF THE INVENTION

This invention has for an aim to provide a method and an apparatus for assessing the wheel alignment of a vehicle to overcome the abovementioned drawbacks of the prior art.

More specifically, this description provides a method and an apparatus for assessing the wheel alignment of a vehicle which are particularly quick and easy to use.

Another aim of this description is to propose a method and an apparatus for assessing the wheel alignment of a vehicle which are particularly reliable.

These aims are fully achieved by the method and apparatus of this invention as characterized in the appended claims.

It should be noted that this description also provides a computer program comprising operating instructions configured to carry out the steps of the method, in particular when the program is run on the apparatus.

More specifically, the apparatus of this description is an apparatus for the diagnostic assessment of the wheel alignment of a vehicle equipped with wheels, where each wheel has a tyre which is coupled to a respective rim.

The apparatus comprises at least one measuring platform.

In an example embodiment, the measuring platform defines a longitudinal crossing direction for a wheel which, as it moves, surmounts and moves across the measuring platform.

In an example embodiment, the apparatus comprises at least one track for contact with the vehicle tyres and oriented in a longitudinal direction. The measuring platform is located along the track.

In an example embodiment, the measuring platform has a top face, defining a tyre contact surface. In an example embodiment, the measuring platform has an underside face, spaced from a surface which supports the apparatus (for example, a floor or base).

The apparatus comprises at least one lateral force sensor connected to the platform and configured to detect a lateral force applied to the platform. This lateral force is directed transversely both to the longitudinal direction (followed by the wheel running on the track) and to the weight force (applied to the platform by the wheel which surmounts the platform itself).

In an example embodiment, the lateral force sensor is connected to the underside face of the platform.

It should be noted that the lateral force sensor (for example a load cell) preferably has a full scale range of around 1000 N.

The apparatus also comprises a processing unit. The processing unit has a processor and a memory. The processing unit is connected to the lateral force sensor to receive a measurement signal representing at least the lateral force transmitted to the platform when the wheel passes over it.

The processing unit is programmed to store at least one forward travel measurement signal detected by the lateral force sensor at a forward travel instant at which one of the vehicle wheels surmounts the measuring platform as it moves along the track in a forward travel direction.

The processing unit is programmed to process at least the forward travel measurement signal to obtain useful information on wheel alignment. This information might consist of a parameter representing the effect of the camber angle and the toe angle, in combination with each other, on the vehicle's motion.

In one embodiment, the processing unit is programmed to store a return travel measurement signal, detected after the forward travel measurement signal, at a return travel instant at which the same vehicle wheel surmounts the measuring platform as it moves along the track in a return travel direction. The return travel direction is opposite to the forward travel direction.

In this embodiment, the processing unit is programmed to process the forward and return travel measurement signals in order to determine, for that wheel, at least one parameter between the camber angle (distinctly from the toe angle) and the toe angle (distinctly from the camber angle).

In one embodiment, the processing unit is programmed to process the forward and return travel measurement signals and to determine, for that wheel, at least the camber angle (distinctly from the toe angle); the processing unit can be also programmed to process the forward and return travel measurement signals and to determine and the toe angle (distinctly from the camber angle).

The forward and return travel measurement signals include at least the lateral forces; in at least one embodiment, forward and return travel measurement signals include the vehicle weight, in addition to the lateral forces.

This description also provides a method for the diagnostic assessment of the wheel alignment of a vehicle equipped with wheels.

The method comprises acquiring a forward travel measurement signal, representing a lateral force applied to a platform in a direction transverse to the longitudinal direction of vehicle movement and to a weight force, at a forward travel instant at which the wheel surmounts the measuring platform as it moves along the track in the forward travel direction.

The forward travel measurement signal is acquired while the vehicle moves longitudinally in the forward travel direction, with at least one of the wheels positioned in contact with a longitudinal track, until the wheel surmounts (and preferably moves past) the measuring platform located along the track.

In an example embodiment, the method also comprises acquiring a return travel measurement signal, representing a lateral force applied to the platform in the transverse direction, at a return travel instant at which the wheel surmounts the measuring platform as it moves along the track in the return travel direction.

The return travel measurement signal is acquired while the vehicle moves longitudinally in the return travel direction, with the wheel positioned in contact with a longitudinal track, until the wheel surmounts (and preferably moves past) the measuring platform located along the track.

The method also comprises a step of processing at least the forward travel measurement signal to obtain useful information on wheel alignment: for example, information on the combined effect of the camber and toe parameters on the vehicle's motion.

In an embodiment, processing applies to both the forward and return travel measurement signals in order to determine for the wheel at least one between the camber angle and the toe angle (distinctly from each other).

In an embodiment, the processing step includes processing the forward and return measurement signals and determining, for the wheel, at least the angle of camber. The toe angle may also be determined in said processing step.

In an example embodiment, the platform is connected to a plurality of (lateral and/or weight) force sensors: for example, two, three or four force sensors.

In an example embodiment, the platform is connected to one or more weight force sensors; these weight force sensors are configured for measuring a weight of the vehicle. The weight force sensors, configured to measure a force applied at right angles to the platform, may be either distinct from the lateral force sensors or they may be integrated in the lateral force sensors to define one or more two-way sensors.

In an example embodiment, the processing unit is configured to receive input data representing the weight of the vehicle being assessed: for example, a nominal value of the weight provided by the vehicle manufacturer. This data may be entered by a user by means of an interface or it may be loaded automatically after searching and selecting it from a database.

The latter solution is particularly useful in the embodiment where the apparatus does not have weight force sensors.

Whatever the case, the processing unit is preferably configured to receive data relating to the lateral forces applied to the platform when the vehicle passes over the platform (as it moves along the track), as well as data relating to the vehicle's weight, in order to process them jointly.

In one embodiment, the apparatus has a first and a second platform, defining a right platform and a left platform.

Preferably, the right and left platforms are positioned along corresponding right and left tracks. In an example embodiment, the right and left platforms are parallel and aligned transversely so they are surmounted simultaneously by the wheels on the same vehicle axle as they move along the tracks.

During the passage of a wheel (or a pair of wheels on the same axle) over the platform, a plurality of force values are acquired by means of the measurement signal. These values might be the object of processing, for example the calculation of a middle value (median or value corresponding to a predetermined percentile or other type of process).

Also acquired are a first measurement signal (during forward and, preferably, also return travel) at a first instant (during forward and, preferably, also return travel) and a second measurement signal (during forward and, preferably, also return travel) at a second instant (during forward and, preferably, also return travel). At the first measuring instant, the platform (or platforms) is (are) surmounted by the wheel (or both wheels) on a first axle. At the second measuring instant, the platform (or platforms) is (are) surmounted by the wheel (or both wheels) on a second axle.

That way, it is possible, for example, to acquire the forward and return travel signals for all four wheels of a vehicle by making the vehicle travel first in a forward direction so the platforms are surmounted by the wheels on the first axle, followed by the wheels on the second axle, and then in a return direction (opposite to the forward direction, that is, in reverse) so the platforms are surmounted by the wheels on the second axle, followed by the wheels on the first axle.

The information regarding the weight of the vehicle can then be acquired separately from the measurement signals detected by the sensors associated with the platforms (for example, by entering a value in a user interface or by loading data from a database). In addition, or alternatively, if the platform is associated with weight force sensors in addition to the lateral force sensors, the weight may be part of the measurement signal.

Thus, weight force sensors may be coupled to the platforms. In an example embodiment, the platform (or each platform, if there is more than one) consists of a single board to which all the lateral force sensors and weight force sensors of that platform are connected. In another example embodiment, the platform comprises two or more boards movably mounted to the base (or supporting surface) independently of each other. In an example embodiment, the platform (or each platform) has at least a first board and a second board which are movably mounted to the base (or supporting surface) independently of each other. The boards making up the platform are aligned along the longitudinal axis defined by the respective track. The lateral force sensors are connected to the first board and the weight force sensors are connected to the second board (or vice versa).

It should be noted that the structure designed to mount the lateral force sensors (the platform or the first board of the platform) is configured to oscillate in the direction transverse to the longitudinal direction of the track (and parallel to the base). It should be noted that the structure designed to mount the weight force sensors (the same platform or the second board of the platform) is configured to oscillate in the direction perpendicular to the base, that is, in the vertical direction of the weight force). These oscillations are limited by the presence of the weight force sensors, which constitute constraining elements which, in practice, absorb the movements the platform would be subjected to, if these sensors were not there, when the wheel passes over it.

In an example embodiment, the apparatus might also comprise, for each measuring platform (it should be noted that, unless otherwise specified, the term "platform" is used in this description to denote the measuring platform), one or more floating platforms.

The floating platforms are positioned along the track, adjacent to the measuring platform. The function of the floating platforms is to discharge and balance any forces applied to the wheels of the vehicle. More specifically, it should be noted that the floating platforms are used to discharge the forces accumulated by the wheels by the effect of the interaction of the wheels themselves with the surface the vehicle rests on (for example, the road surface).

In an example embodiment, the apparatus comprises at least one floating platform for each measuring platform. The floating platform is positioned along the track, adjacent to the measuring platform.

In an example embodiment, the apparatus comprises a first and a second floating platform for each measuring platform. The first and second floating platforms are positioned along the track, adjacent to the measuring platform. The measuring platform is interposed between the first and the second floating platform.

Each floating platform is free to move in a displacement plane containing the tyre contact surface when the vehicle passes with one of its wheels surmounting the floating platform itself.

In an example embodiment, the apparatus comprises, for each measuring platform, at least one ramp, positioned along the track. The ramp defines an increasing (vertical) thickness in a direction towards the measuring platform. The ramp is elongate in the longitudinal direction. In an example embodiment, the track is defined by the ramp and the corresponding measuring platform, which are aligned along the longitudinal direction. It should be noted that the measuring platform is preferably horizontal, that is, perpendicular to the weight force.

In an example embodiment, the apparatus comprises, for each measuring platform, at least a first and a second ramp, positioned along the track. The measuring platform is interposed between the first and the second ramp.

The first and the second ramps are inclined to the contact surface (which the wheel is positioned on when it surmounts the measuring platform) in order to join it to the supporting surface (which the wheel is positioned on when it does not surmount the measuring platform and is on the track instead).

In practice, the contact surface on which the wheel is positioned when it surmounts the measuring platform is at a higher level than the supporting surface it is positioned on when it does not surmount the measuring platform and is on the track instead. This is due to the thickness of the platform and of the sensors (at least of the lateral force sensors) located under it (between it and the base or the supporting surface).

In a further example embodiment, the top surface of the board is flush with the floor. In this case, the apparatus does not have the ramp. In an example embodiment, each platform comprises a stretch having a longitudinal extension and positioned adjacent to the portion (board) of the platform which is adapted to oscillate and which is connected to the sensors. This solution is such that the wheel, as it moves along the track, surmounts the platform board in a plane parallel to the base, and at the same height: this makes calculations more accurate.

The processing unit receives data representing the lateral forces applied by the wheels on the measuring platforms when the wheels pass over the measuring platforms (this refers to the case where there are a plurality of measuring platforms but is also applicable to the case where there is a single measuring platform). The processing unit also receives data representing the weight force applied by the wheels on the measuring platforms when the wheels pass over the measuring platforms.

The processing unit has access to a memory containing the data representing a mathematical model of the dynamic behaviour of the vehicle as a function of a plurality of model parameters. These model parameters include the lateral force applied by the wheels on the surface they roll on, the weight force, the toe angle of the wheels and the camber angle of the wheels.

For example, the mathematical model can be summed up in the following formula (1):

$$f(x,y,A,B)=0 \tag{1}$$

where, for each wheel, "x" is the toe angle, "y" the camber angle, "A" the lateral force during rolling and "B" the weight force during rolling.

For example, this formula can be implemented using the mathematical model of a tyre described by "Pacejka's Magic Formula" (Pacejka, Bakker et al. (1987)). This model represents complex and semi-empirical relations which take into consideration the interaction between the longitudinal force and the lateral force of the tyre under combined braking and steering conditions.

If measurements are taken only in one direction of the vehicle (for example, forward) knowing the values of the parameters "a" and "b" makes it possible to derive a parameter which is a function of the parameters "x" (toe angle) and "y" (camber angle): $Z=g(x,y)$; but it is not possible to distinguish between, and distinctly calculate, the parameters "x" (toe angle) and "y" (camber angle).

In this regard, it should be noted that the mathematical model allows calculating the lateral force (for each wheel and hence for the vehicle) deriving the weight of the vehicle from the camber angle which is (essentially) known and from the toe angle which is (essentially) known. The vehicle manufacturer provides a range of admissible values for the camber and toe angles.

In an example embodiment, the processing unit is configured to compare the lateral force value, obtained in the measurement, with a value given by a sum of the lateral force ranges deriving from the data provided by the manufacturer. This gives the tyre service specialist an approximate indication without, however, providing a key for distinguishing the individual contributions of the toe and camber angles to the lateral force.

If measurements are taken in both directions of the vehicle (forward and return), knowing the values of the parameters "a" and "b" in both cases makes it possible to distinguish between and distinctly calculate the parameters "x" (toe angle) and "y" (camber angle) since in passing from one travel direction to the opposite direction, the parameter "x" (toe angle) keeps its sign while the parameter "y" (camber angle) inverts its sign.

In one embodiment, in order to calculate the camber parameter (C) and the toe parameter (T), the following formulas can be used, respectively.

$$T = K_{T,1}(W) \cdot \frac{F_T}{W} + K_{T,2}(W) \cdot \left(\frac{F_T}{W}\right)^2 + K_{T,3}(W) \cdot \left(\frac{F_T}{W}\right)^3 + \ldots \tag{2}$$

$$C = K_{C,1}(W) \cdot \frac{F_C}{W} + K_{C,2}(W) \cdot \left(\frac{F_C}{W}\right)^2 + K_{C,3}(W) \cdot \left(\frac{F_C}{W}\right)^3 + \ldots \tag{3}$$

In each of these formulas (2) and (3), an additional member, "$K_{T0}$" and "$K_{C0}$" can be provided, indicating a constant.

In said formulas (2) and (3), "W" indicates the vehicle weight.

In said formulas (2) and (3), "$K_{T,i}$" and "$K_{C,i}$" indicate an adjustment factor, which is a (typically non linear) function of the vehicle weight W; such functions, i.e. the adjustment factors are known in the literature.

In said formulas (2) and (3), "$F_T$" and "$F_C$" indicate force components to be used in the calculation of the camber parameter (C) and of the toe parameter (T), respectively.

These parameters, "$F_T$" and "$F_C$", can be derived from the values of the lateral force "$F_A$," measured during the forward movement of the vehicle and the lateral force "$F_I$" measured during the rear movement of the vehicle; as an example, parameters, "$F_T$" and "$F_C$", can be derived through the following equations.

$$F_T = K_1 \cdot F_A + K_2 \cdot F_I \quad (4)$$

$$F_C = K_3 \cdot F_A + K_4 \cdot F_I \quad (5)$$

where $K_1$, $K_2$, $K_3$, $K_4$ indicate constant factors.
In a possible embodiment, one can assume that $$K_1 = K_3 = K_4 = \tfrac{1}{2}$$

$$K_2 = -\tfrac{1}{2}$$

From this assumption, the following equations can be derived.

$$F_T = \frac{F_A - F_I}{2} \quad (6)$$

$$F_C = \frac{F_A + F_I}{2} \quad (7)$$

In an example embodiment, the processing unit might be programmed to derive also one or more further parameters for the vehicle wheel, such as, for example, plysteer and conicity (of the individual wheel).

It should be noted that the processing unit has access (for example through a network connection or other communication channel) to a memory containing data representing one or more of the following further parameters for the vehicle wheel: conicity, eccentricity, tyre tread depth, rolling radius.

In an example embodiment, these further parameters are calculated by a balancing machine, by a tyre changer or by a wheel alignment apparatus (for example based on a derivation of the spatial position of the wheels).

In an example embodiment, the processing unit might have access (for example through a network connection or other communication channel) to a memory containing data representing one or more further parameters for the vehicle wheel, such as a variation of the radial force applied to the tyre as it rolls, or a variation of the lateral force applied to the tyre as it rolls, where these force variations are derived by placing the wheel on a rotating support and setting it in rotation while a roller is pressed radially against the tyre tread.

In another example embodiment, the processing unit might have access to a memory containing data representing other parameters of the vehicle wheel such as, for example, one or more of the following parameters: rolling radius under load, rolling resistance under load, inflation pressure, wheel type and geometrical dimensions (for example, steered wheel, symmetric or anti-symmetric wheel) tyre tread depth, tyre load index.

This patent application also provides a system of wheel service machines interconnected by a data connection to exchange and/or share in a memory the data representing one or more parameters measured (or derived) by the respective machines. In addition to the apparatus for the diagnostic assessment of the wheel alignment of a vehicle (forming the specific object of the claims of this patent document), these wheel service machines include one or more of the other aforementioned machines.

This description also provides a computer program comprising operating instructions configured to carry out the steps of a method for the diagnostic assessment of the wheel alignment of a vehicle, where the method is according to one or more of the aspects described in this description. More specifically, the operating instructions are configured to carry out the method when they are carried out by the processing unit of the apparatus for the diagnostic assessment of the wheel alignment of a vehicle where the apparatus is according to one or more of the aspects described in this description.

This description also provides a data storage device containing data representing the computer program.

This description also provides a data flow (for example downloadable from a server computer to a client computer) where the data represent the computer program.

BRIEF DESCRIPTION OF THE DRAWINGS

This and other features of the invention will become more apparent from the following detailed description of a preferred, non-limiting example embodiment of it, with reference to the accompanying drawings, in which.

DESCRIPTION OF THE PREFERRED EMBODIMENTS

Figure 1:
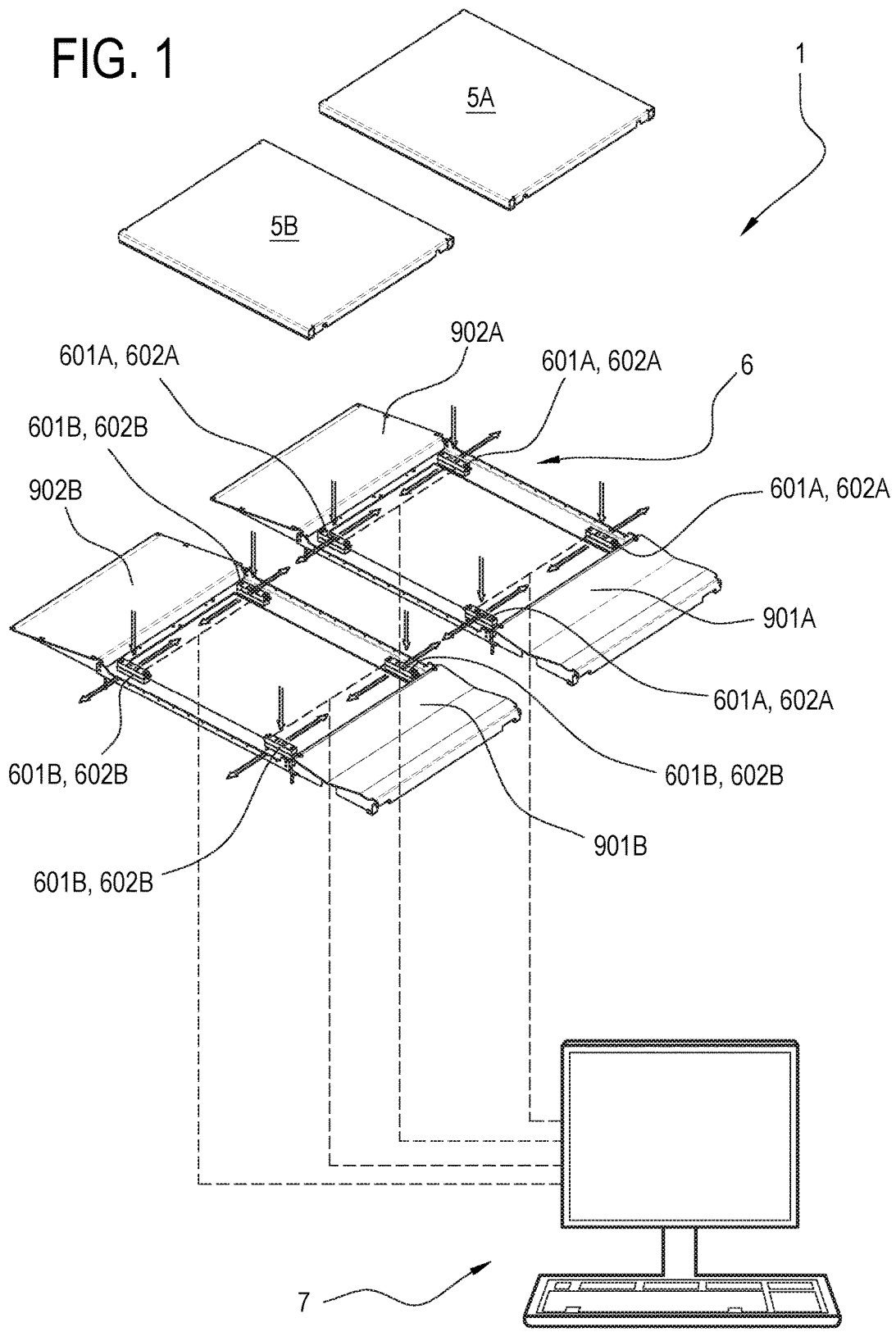
FIG. 1 shows an exploded view of an apparatus according to this description.
Figure 2:
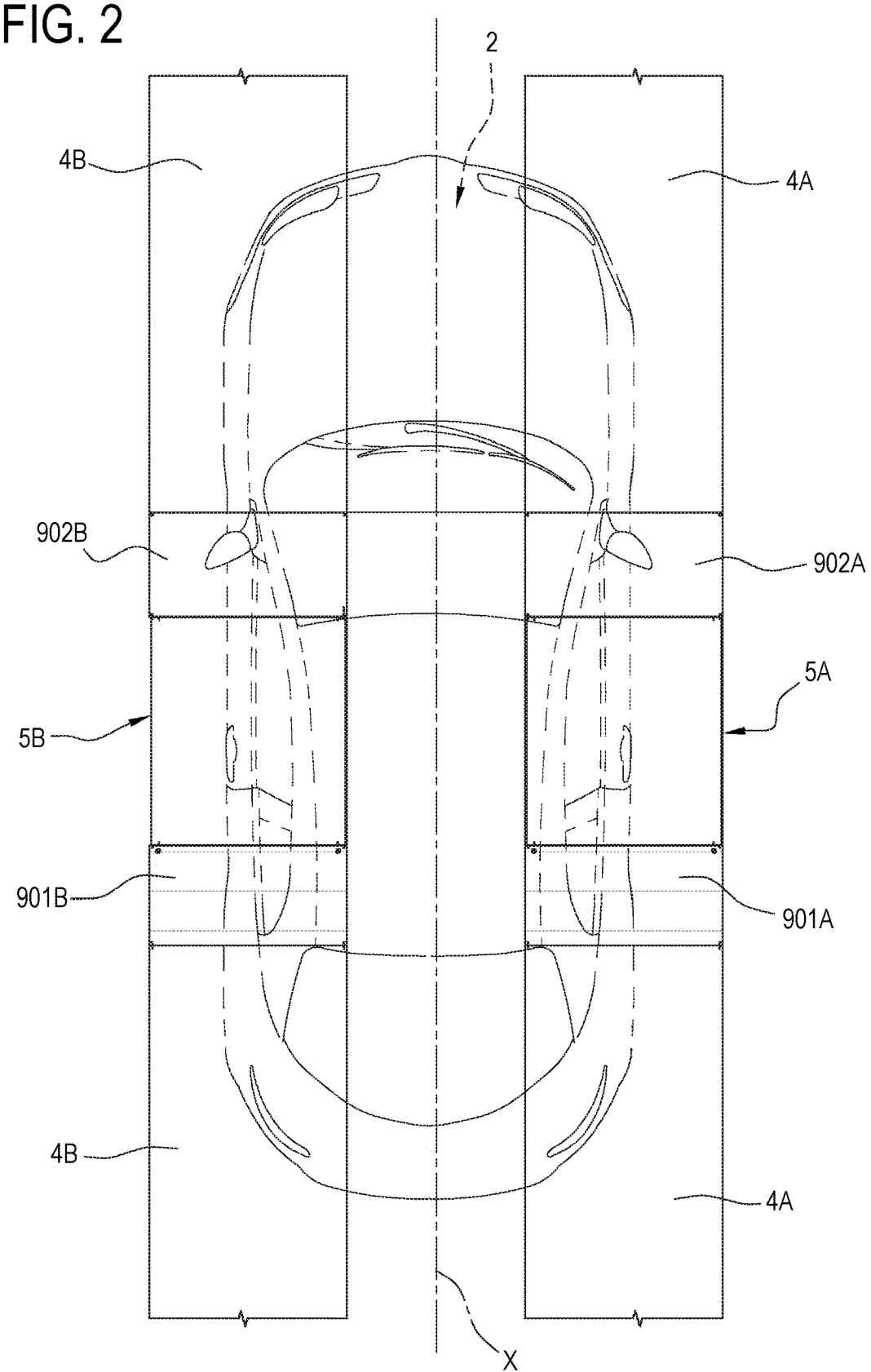
FIG. 2 is a top view of the apparatus of FIG. 1.
Figure 3:
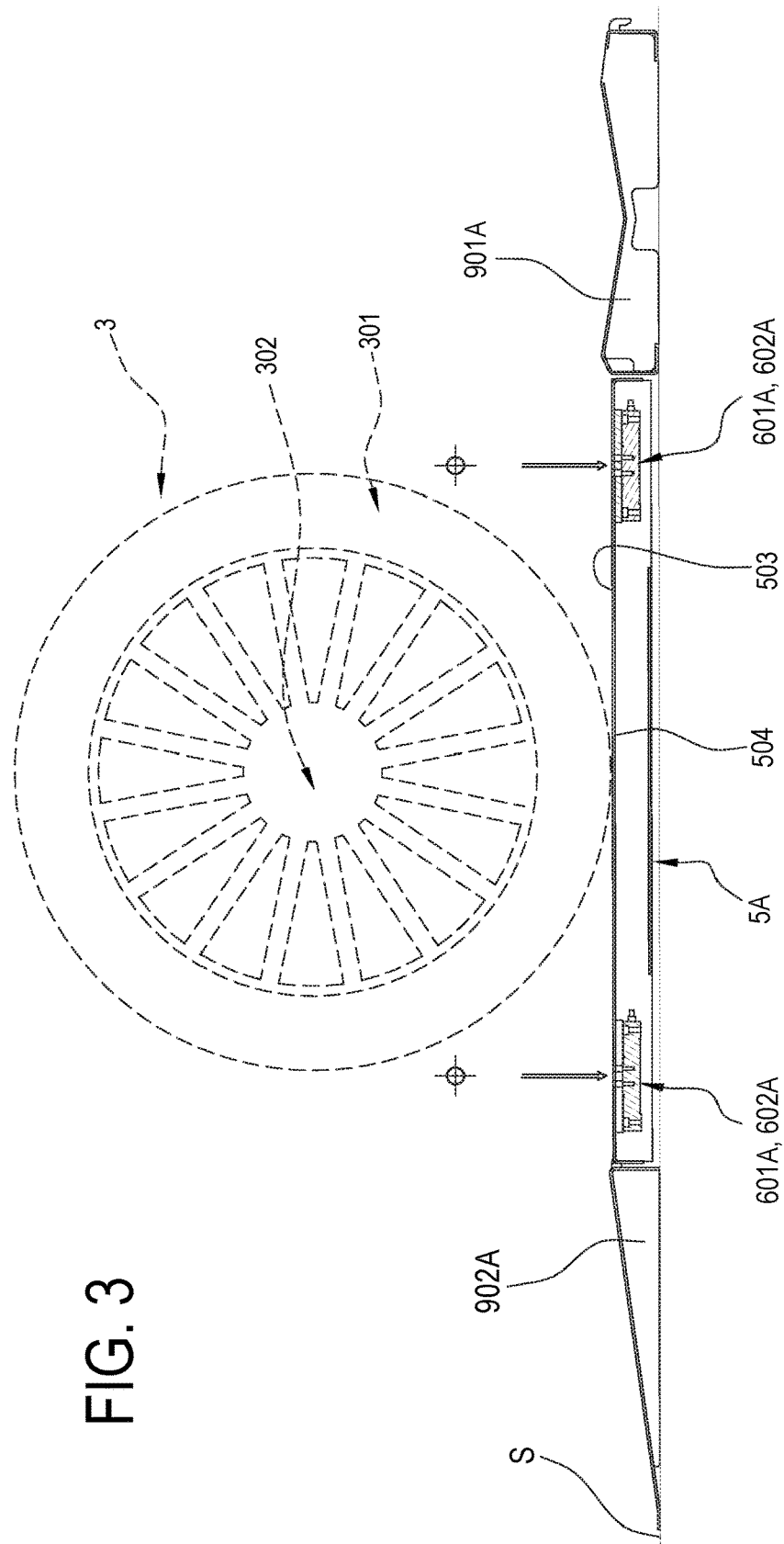
FIG. 3 is a side view of the apparatus of FIG. 1.
Figure 4:
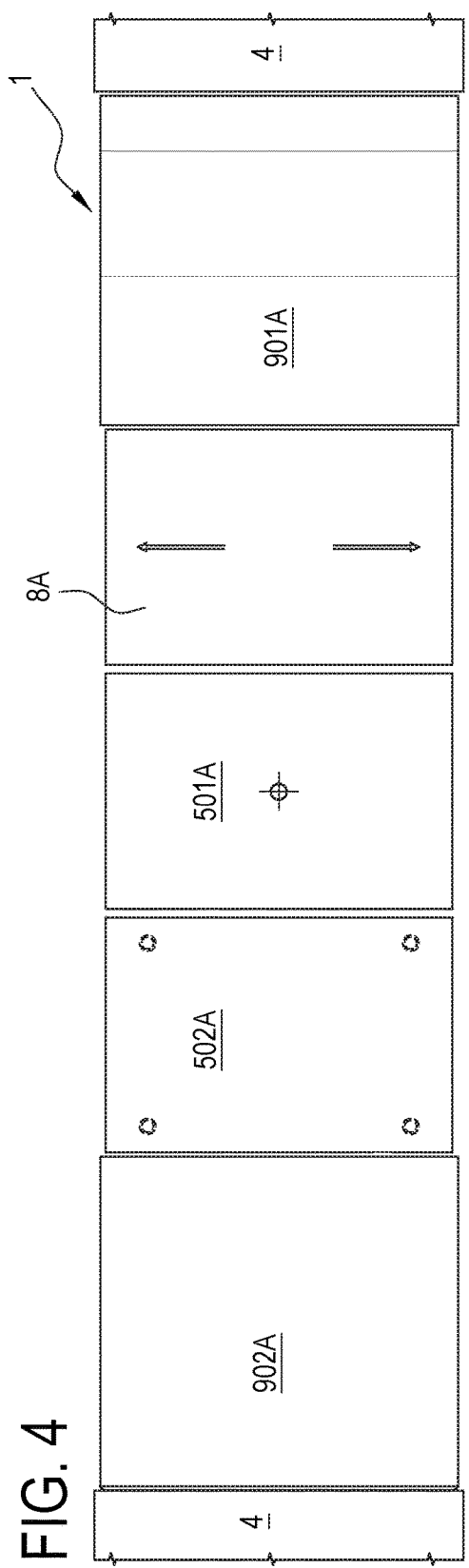
FIG. 4 shows the apparatus of FIG. 2 according to an alternative embodiment.
Figure 5:
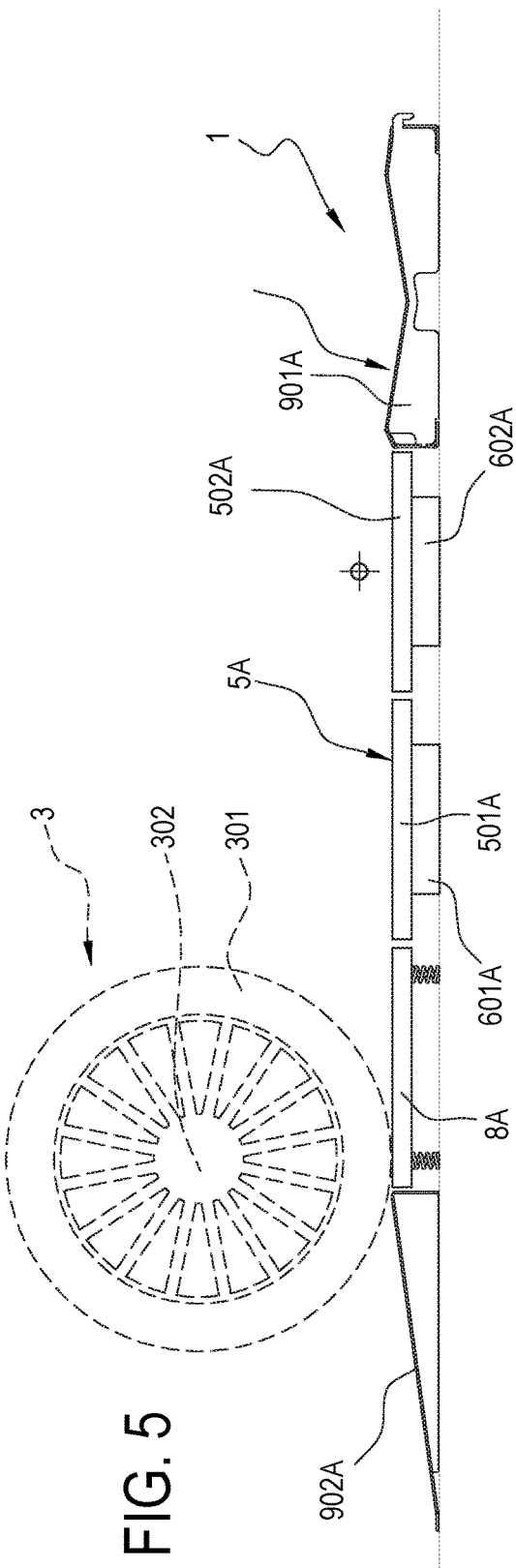
FIG. 5 is a side view of the apparatus of FIG. 4.

The numeral 1 in the drawings denotes an apparatus for the diagnostic assessment of the wheel alignment of a vehicle 2.

The vehicle 2 is provided with wheels 3. Each wheel 3 has a tyre 301 coupled to a respective rim 302.

In one embodiment, the apparatus 1 includes a right track 4A and a left track 4B. Each track 4A, 4B defines a path for contact with a wheel 3 (or rather, with the tyre 301) of the vehicle 2.

Each track 4A, 4B is oriented in a longitudinal direction. The right and left tracks 4A, 4B are parallel to each other. The right and left tracks 4A, 4B are transversely spaced by a quantity substantially equal to the distance between the wheels 3 on the same axle of the vehicle 2.

In an example embodiment, the right and left tracks 4A, 4B are movable relative to each other, in particular to adjust their spacing (in the transverse direction).

In an example embodiment, the right and left tracks 4A, 4B are rested (or defined) on a base, that is, on a supporting surface S. In one example, the right and left tracks 4A, 4B are part of a structure or frame designed to support the vehicle (for example a vehicle lift).

It should be noted that in one embodiment, the apparatus 1 might include only one track 4A.

In an example embodiment, the apparatus comprises a right measuring platform 5A and a left measuring platform 5B.

The right and left measuring platforms 5A, 5B are each positioned along a corresponding track 4A, 4B.

It should be noted that in one embodiment, the apparatus 1 might include only one measuring platform 5A.

Each measuring platform 5A, 5B has a top face 503 and an underside face 504. The top face 503 of each measuring platform 5A, 5B defines a contact surface for the tyres 301. The contact surface for the tyres 301 is spaced from the supporting surface S (by a predetermined height, for example a few centimetres).

The apparatus 1 comprises a sensor system 6.

The sensor system 6 comprises at least one lateral force sensor 601. More specifically, the sensor system 6 comprises at least one lateral force sensor 601 for each measuring platform 5A, 5B.

The lateral force sensor 601 is connected to the respective measuring platform 5A, 5B. The lateral force sensor 601 is configured to detect a lateral force applied to the measuring platform 5A, 5B by a wheel 3 which passes over the platform while travelling the track 4. The lateral force is directed in the transverse direction (relative to the longitudinal direction of the tracks 4A, 4B) perpendicularly to the weight force (that is, to the vertical).

For example, the lateral force sensor 601 is a load cell. In another example embodiment, the lateral force sensor 601 might comprise piezoelectric sensors (piezoresistive, piezocapacitive sensors), extensometers, a spring/displacement gauge system (e.g. potentiometer) or a pressure cylinder acting in conjunction with a pressure sensor.

The apparatus 1 comprises a processing unit 7.

In an example embodiment, the processing unit 7 has a processor. Preferably, the processing unit 7 also has a memory.

The processing unit 7 is connected to the sensor system 6 to receive measurement signals. In an example embodiment, the processing unit 7 is connected at least to the lateral force sensor 601 to receive a measurement signal representing at least the aforementioned lateral force.

The processing unit 7 is programmed to acquire (and store at least temporarily) at least one measurement signal detected by the sensor system 6 at least at an instant at which one of the wheels 3 of the vehicle 2 surmounts one of the measuring platforms 5A, 5B while moving along the corresponding track 4A, 4B.

The processing unit 7 is programmed to process the measurement signals acquired to determine (that is, derive) at least one camber angle and/or toe angle for that wheel.

In the example embodiment where the apparatus 1 comprises the right and left tracks 4A, 4B and the right and left measuring platforms 5A, 5B, right and left lateral force sensors 601A, 601B are connected to the platforms, respectively.

In such case, the processing unit 7 is also connected to the left lateral force sensor 601B to acquire further measurement signals.

The processing unit 7 is programmed to process the measurement signals detected by the right and left lateral force sensors 601A, 601B to determine, for both wheels 3 on the same axle of the vehicle 2, at least the camber angle and/or the toe angle.

In an example embodiment, the processing unit 7 is configured to acquire the following for each measuring platform 5A, 5B:

at least one forward travel measurement signal, detected by the sensor system 6 at a forward travel instant at which the wheel 3 of the vehicle 2 surmounts the measuring platform 5A, 5B as it moves along the track 4A, 4B in the forward travel direction; and at least one return travel measurement signal, detected by the sensor system 6 at a return travel instant at which the wheel 3 of the vehicle surmounts the measuring platform 5A, 5B as it moves along the track 4A, 4B in the return travel direction, opposite to the first direction.

The second instant comes after the first instant, which means the respective measurements are taken in temporal succession.

In this example embodiment, the processing unit 7 is programmed to process the forward and return measurement signals in order to determine, for that wheel, at least the angle of camber and/or toe.

Preferably, the measurement is repeated for the wheels 3 on the first axle of the vehicle 2 and for the wheels 3 on the second axle of the vehicle 2. This applies to both the forward and return travel of the vehicle.

Thus, in this example embodiment, the processing unit 7 is programmed to store at least a first and a second forward travel measurement signal and a first and a second return travel measurement signal.

At the first and second forward travel instants, (at least one wheel, or) both of the wheels on the first axle of the vehicle 2, and (at least the corresponding wheel, or) the wheels on the second axle of the vehicle, respectively, surmount the measuring platforms 5A, 5B as they move along the tracks 4A, 4B in the forward travel direction. The first forward travel instant precedes the second forward travel instant.

At the first and second return travel instants, (at least one wheel, or) the wheels on the first axle and (at least the corresponding wheel, or) the wheels on the second axle of the vehicle, respectively, surmount the measuring platforms 5A, 5B as they move along the tracks 4A, 4B in the return travel direction. The first return travel instant follows the second return travel instant.

Thus, in an example embodiment, the processing unit 7 is programmed to process the first and second forward and return measurement signals in order to determine the angle of camber and/or the angle of toe of the wheels 3 on both axles of the vehicle 2.

In an example embodiment, the apparatus comprises, for each platform 5A, 5B, at least one weight force sensor 602A, 602B.

The weight force sensors 602A, 602B form part of the sensor system 6.

In an example embodiment, at least one right weight force sensor 602A is connected to the right measuring platform 5A and at least one left weight force sensor 602B is connected to the left measuring platform 5B.

For example, each weight force sensor 602A, 602B is (operatively) connected to the underside face 502 of the corresponding measuring platform 5A, 5B.

Each weight force sensor 602A, 602B is configured to measure a weight force applied to the measuring platform 5A, 5B perpendicularly to the contact surface defined by the platform.

In an example embodiment, a plurality of lateral force sensors 601A, 601B, (for example, four) are connected to each measuring platform 5A, 5B.

In an example embodiment, a plurality of weight force sensors 602A, 602B, (for example, four) are connected to each measuring platform 5A, 5B.

In an example embodiment, each (right or left) measuring platform 5A, 5B might include only one board to which all the corresponding (right or left) sensors are connected.

In an example embodiment, a plurality of two-way sensors (for example, four), each defining both a lateral force sensor 601A, 601B and a weight force sensor 602A, 602B, are connected to each measuring platform 5A, 5B.

In another example embodiment, each (right or left) measuring platform 5A, 5B might include a first board 501A, 501B and a second board 502A, 502B.

The first board 501A, 501B is movable (that is, enabled to measure when the wheel passes over it) independently of the respective second board 502A, 502B.

The first board 501A, 501B is aligned along the same track 4A, 4b, relative to the corresponding second board 502A, 502B, and preferably adjacent thereto.

Preferably, in this example embodiment, the lateral force sensors 601A, 601B are connected to the first board 501A, 501B, and the weight force sensors 602A, 602B are connected to the second board 502A, 502B of the (right or left) measuring platform 5A, 5B.

In an example embodiment, the apparatus 1 comprises at least one floating platform 8A, 8B for each (right or left) measuring platform 5A, 5B.

Each floating platform 8A, 8B is positioned along the corresponding track 4A, 4B, adjacent to the measuring platform 5A, 5B.

In an example embodiment, the apparatus 1 comprises, for each (right or left) measuring platform 5A, 5B, a first floating platform 801A and a second floating platform 802A, positioned adjacent to the measuring platform 5A, 5B along the track 4A. 4B. In this case, the measuring platform 5A, 5B is interposed between the first and the second floating platform 801A, 801B.

Each floating platform 801A, 801B, 802A, 802B (8A, 8B) is free to move in a displacement plane containing the contact surface for the tyres 301, when the vehicle passes with one of its wheels 3 surmounting the floating platform itself.

In an example embodiment, the apparatus 1 comprises, for each (right or left) measuring platform 5A, 5B, at least one ramp 9A, 9B, positioned along the track 4A, 4B. The ramp 9A, 9B is inclined to the contact surface of the measuring platform 5A, 5B in order to join it to the supporting surface S.

In an example embodiment, the apparatus 1 comprises, for each (right or left) measuring platform 5A, 5B, a first ramp 901A, 901B and a second ramp 902A, 902B, positioned along the respective track 4A, 4B.

Each measuring platform 5A, 5B is interposed between the first ramp 901A, 901B and the second ramp 902A, 902B. Each ramp 901A, 901B, 902A, 902B (9A, 9B) has a variable thickness, increasing in a direction towards the measuring platform 5A, 5B.

If both the floating platform 801A, 801B, 802A, 802B (8A, 8B) and the ramp 901A, 901B, 902A, 902B (9A, 9B) are present, the floating ramp 801A, 801B, 802A, 802B (8A, 8B) is interposed between the ramp 901A, 901B, 902A, 902B (9A, 9B) and the corresponding measuring platform 5A, 5B.

In a further example embodiment, the measuring platform 5A, 5B (and more specifically, its top face 503) is flush with the supporting surface. In this case, for example, the apparatus is without the ramps 901A, 901B, 902A, 902B.

This description also provides a method for the diagnostic assessment of the wheel alignment of the vehicle 2.

In an example embodiment, the method comprises the following steps (preferably in temporal succession):

a) longitudinally moving the vehicle 2 in a forward travel direction with at least the wheels 3 of the first axle of the vehicle 2 positioned on the longitudinal tracks 4A, 4B, until the wheels 3 of the first axle of the vehicle 2 surmount the measuring platforms 5A, 5B;

b) acquiring a first forward travel measurement signal, representing at least the lateral forces measured by the lateral force sensors 601A, 601B connected to the measuring platforms 5A, 5B when the wheels 3 on the first axle of the vehicle 2 pass (by rolling) over the measuring platforms 5A, 5B in the forward travel direction;

c) longitudinally moving the vehicle 2 in the forward travel direction with at least the wheels 3 of the second axle of the vehicle 2 positioned on the longitudinal tracks 4A, 4B, until the wheels 3 of the second axle of the vehicle 2 surmount the measuring platforms 5A, 5B;

d) acquiring a second forward travel measurement signal, representing at least the lateral forces measured by the lateral force sensors 601A, 601B connected to the measuring platforms 5A, 5B when the wheels 3 on the second axle of the vehicle 2 pass (by rolling) over the measuring platforms 5A, 5B in the forward travel direction;

e) longitudinally moving the vehicle 2 in the return travel direction (opposite to the forward travel direction) with at least the wheels 3 of the second axle of the vehicle 2 positioned on the longitudinal tracks 4A, 4B, until the wheels 3 of the second axle of the vehicle 2 surmount the measuring platforms 5A, 5B;

f) acquiring a second return travel measurement signal, representing at least the lateral forces measured by the lateral force sensors 601A, 601B connected to the measuring platforms 5A, 5B when the wheels 3 on the second axle of the vehicle 2 pass (by rolling) over the measuring platforms 5A, 5B in the return travel direction;

g) longitudinally moving the vehicle 2 in the return travel direction with at least the wheels 3 of the first axle of the vehicle 2 positioned on the longitudinal tracks 4A, 4B, until the wheels 3 of the first axle of the vehicle 2 surmount the measuring platforms 5A, 5B;

h) acquiring a first return travel measurement signal, representing at least the lateral forces measured by the lateral force sensors 601A, 601B connected to the measuring platforms 5A, 5B when the wheels 3 on the first axle of the vehicle 2 pass (by rolling) over the measuring platforms 5A, 5B in the return travel direction;

i) processing the first and second forward and return measurement signals in order to determine the angle of camber and/or the angle of toe of the wheels 3 on the first and second axles of the vehicle 2.

In an example embodiment, this processing step comprises comparing the forward and return travel signals (first and second, respectively) relating to the same wheel 3.

In an example embodiment, the acquiring steps b, d, f and h also entail acquiring related data representing a weight force applied by the vehicle 2 on the measuring platforms 5A, 5B when the vehicle passes over the platforms. Thus, the related measurement signals also represent that weight force.

It should be noted that in a variant embodiment of the above method (steps a to i), only the wheels 3 on one of the two axles of the vehicle 2 are measured (which means, for example, that steps c, d, e and f might be omitted).

It should be noted that in a variant embodiment of the above method (steps a to i), only the wheels 3 on one of the two sides of the vehicle 2 are measured (for example, only the left wheels or only the right wheels). That means, in this example, that the measurement signals acquired might be from a single measuring platform 5A (or 5B).

It should also be noted that a wheel 3 takes a certain interval of time (depending on the speed of the vehicle 2) to pass over the measuring platform 5A, 5B completely. In that interval of time, a plurality of acquisitions can be performed (for example, the data measured in the plurality of acquisitions may be averaged). In a further example embodiment, the plurality of acquisitions is suitably processed to obtain a value representing the lateral force measurements: for example, the signal may be filtered to eliminate unwanted noise.

If there are weight force sensors 602A, 602B connected to the same measuring platform 5A, 5B to which the lateral force sensors 601A, 601B are connected, the data relating to both the weight forces and the lateral forces are acquired at the same instant. If there are weight force sensors 602A, 602B connected to a second board 502A, 502B distinct from a first board 501A, 501B of the same measuring platform 5A, 5B, the lateral force sensors 601A, 601B are connected to the first board 501A, 501B and the data relating to both the weight forces and the lateral forces (for the same measurement signal) are acquired at two different, successive instants, as a function of the sequential order in which the second board 502A, 502B and the first board 501A, 501B are located on the same measuring platform 5A, 5B, and as a function of the direction of travel of the vehicle 2.

This description also provides a computer program (a software). This computer program comprises operating instructions configured to carry out at least steps b, h and i of the method described above. In one embodiment, the computer program comprises operating instructions configured to also carry out steps d and f, in addition steps b, h and i, of the method described above.

Hence, the present disclosure renders available a method for the diagnostic assessment of the wheel alignment of a vehicle 2 equipped with wheels 3 having tyres 301 coupled to respective rims 302, comprising the following steps:
  acquiring a forward travel measurement signal, representing a lateral force applied to the platform and directed transversely to both the longitudinal direction and the weight force at a forward travel instant at which the wheel surmounts the measuring platform (5A) as it moves along the track (4A) in the forward travel direction, during (in) a longitudinal movement of the vehicle (2) in a forward travel direction with at least one of the wheels (3) positioned in contact with a longitudinal track (4A), until the wheel (3) surmounts a measuring platform (5A) located along the track (4A);
  acquiring a return travel measurement signal, representing a lateral force applied to the platform (5A) and directed transversely at a return travel instant at which the wheel (3) surmounts the measuring platform (5A) as it moves along the track (4A) in the return travel direction, during (in) a longitudinal movement of the vehicle (2) in a return travel direction opposite to the forward travel direction with the wheel (3) positioned in contact with the longitudinal track (4A), until the wheel surmounts the measuring platform (5A);
  processing the forward and return measurement signals and determining, for the wheel (3), at least an angle of camber.

In one embodiment, said steps of acquiring and processing are carried out through a software; whereas the movement of the vehicle may or may not (according to different embodiments) be controlled via said software.

What is claimed is:

1. A method for the diagnostic assessment of the wheel alignment of a vehicle equipped with wheels having tyres coupled to respective rims, comprising the following steps:
  in a longitudinal movement of the vehicle in a forward travel direction with at least one of the wheels positioned in contact with a longitudinal track, until the wheel surmounts a measuring platform located along the track, acquiring a forward travel measurement signal, representing a lateral force applied to the platform and directed transversely to both the longitudinal direction and the weight force at a forward travel instant at which the wheel surmounts the measuring platform as it moves along the track in the forward travel direction;
  in a longitudinal movement of the vehicle in a return travel direction opposite to the forward travel direction with the wheel positioned in contact with the longitudinal track, until the wheel surmounts the measuring platform, acquiring a return travel measurement signal, representing a lateral force applied to the platform and directed transversely at a return travel instant at which the wheel surmounts the measuring platform as it moves along the track in the return travel direction;
  obtaining at least one weight force value, by measuring, with at least one weight force sensor, a weight force applied on the measuring platform when the wheel passes over the platform;
  processing the forward and return measurement signals in order to determine, for the wheel, at least an angle of camber and/or toe, the forward and return travel measurement signals are processed as a function of the at least one weight force value.

2. The method according to claim 1, wherein
  the at least one track is a right track and the at least one measuring platform is a right measuring platform;
  in the acquiring steps, the movements of the vehicle longitudinally in the forward and return directions occur with a first wheel of the vehicle positioned on the right track and a second wheel of the vehicle positioned on a left track, until both wheels surmount the right and left measuring platforms, located along corresponding right and left tracks, respectively;
  the forward and return travel measurement signals acquired at the forward and return travel instants represent lateral forces applied to the right platform and to the left platform;
  processing the forward and return travel measurement signals determines at least the angle of camber and/or the angle of toe of both of the wheels on the same axle of the vehicle.

3. The method according to claim 1, wherein
  in the acquiring steps, the movement of the vehicle longitudinally in the forward and return directions occurs until one wheel on a first axle of the vehicle, and then a corresponding wheel on a second axle of the vehicle surmount the measuring platform as they move along the track in the forward travel direction at a first and a second forward and return travel instants, respectively;
  at the first forward travel instant, a first forward travel measurement signal is acquired which represents the lateral force applied to the measuring platform by the wheel on the first axle at the first forward travel instant;

at the second forward travel instant, a second forward travel measurement signal is acquired which represents the lateral force applied to the measuring platform by the wheel on the second axle at the second forward travel instant;

at the first return travel instant, a second return travel measurement signal is acquired which represents the lateral force applied to the measuring platform by the wheel on the second axle at the first return travel instant;

at the second return travel instant, a first return travel measurement signal is acquired which represents the lateral force applied to the measuring platform by the wheel on the first axle at the second return travel instant;

processing the first and second forward and return measurement signals determines the angle of camber and the angle of toe of the at least one wheel on the first axles of the vehicle and at least one corresponding wheel on the second axle of the vehicle.

4. The method according to claim 1, wherein processing comprises a step of cancelling a contribution of the angle of wheel toe to the lateral force by comparing the forward and return travel measurement signals.

5. The method according to claim 1, comprising a step of detecting a forward or return direction traveled by the wheel on the track when the wheel passes over the platform.

6. The method according to claim 1, wherein the processing step comprises processing the forward and return travel measurement signals to determine also an angle of toe of the at least one wheel.

7. The method of claim 1, wherein, is the step of processing the forward and return measurement signals, the angle of camber is determined.

8. An apparatus for the diagnostic assessment of the wheel alignment of a vehicle equipped with wheels having tyres coupled to respective rims, comprising:
at least one track for contact with the tyres of the vehicle, and oriented in a longitudinal direction;
at least one measuring platform which is located along the track and which has a top face defining a contact surface for the tyres and spaced from a supporting surface;
at least one lateral force sensor connected to the measuring platform and configured to detect a lateral force applied to the measuring platform transversely to the longitudinal direction and to a weight force;
at least one weight force censor connected to the measuring platform and configured to detect a weight force applied on the measuring platform when the wheel passes over the platform;
a processing unit connected at least to the lateral force sensor to receive a measurement signal representing at least the lateral force, the processing unit further connected to the at least one weight force sensor to obtain at least one weight force value, representing the weight force applied on the measuring platform;
wherein the processing unit is programmed to store at least one forward travel measurement signal and one return travel measurement signal detected at least by the lateral force sensor in temporal succession at a forward travel instant at which the wheel of the vehicle surmounts the measuring platform as it moves along the track in a forward travel direction, and at a return travel instant at which the wheel of the vehicle surmounts the measuring platform as it moves along the track in a return travel direction, opposite to the first direction, respectively, and is programmed to process the forward and return travel measurement signal to determine at least an angle of camber for that wheel, the forward and return travel measurement signals are processed as a function of the at least one weight force value.

9. The apparatus according to claim 8, wherein the at least one track is a right track and the at least one measuring platform is a right measuring platform and the at least one lateral force sensor is a right lateral force sensor, and wherein the apparatus further comprises:
a longitudinal left track, parallel to the right track;
a left measuring platform which is located along the left track and which has a top face defining a contact surface for the tyres of the vehicle and spaced from a supporting surface;
a left lateral force sensor connected to the left platform and configured to measure a lateral force applied to the left platform transversely to the longitudinal direction of the tracks and to the weight force,
wherein the processing unit is also connected to the left lateral force sensor, to receive and store further forward and return travel measurement signals, and is programmed to process the forward and return travel measurement signals detected in succession by the right and left lateral force sensors to determine at least the angle of camber for both of the wheels on one vehicle axle.

10. The apparatus according to claim 8, wherein the processing unit is programmed to store at least a first and a second forward travel measurement signal detected in temporal succession at a first and a second forward travel instant, at which one wheel on a first axle and a corresponding wheel on a second axle of the vehicle, respectively, surmount the measuring platform as they move along the track in the forward travel direction and wherein the processing unit is programmed to store at least a first and a second return travel measurement signal detected in temporal succession at a first and a second return travel instant, at which the wheel on the second axle and the corresponding wheel on the first axle of the vehicle, respectively, surmount the measuring platform as they move along the track in the return travel direction, and wherein the processing unit is programmed to process the first and second forward measurement signals and the first and second return travel measurement signals to determine the angle of camber for the at least one wheel on the first axle and the at least one corresponding wheel on the second axle of the vehicle.

11. The apparatus according to claim 8, comprising at least one weight force sensor operatively connected to the underside face of the at least one measuring platform and configured to detect a weight force applied perpendicularly to the platform.

12. The apparatus according to claim 8, comprising at least a first and a second floating platform positioned adjacent to the measuring platform along the track, the measuring platform being interposed between the first and the second floating platform, each floating platform being free to move in a displacement plane containing the tyre contact surface when the vehicle passes with one of its wheels surmounting the floating platform itself.

13. The apparatus according to claim 8, comprising at least a first and a second ramp located along the track, the measuring platform being interposed between the first and the second ramp and inclined to the contact surface to join it to the supporting surface.

14. A method for the diagnostic assessment of the wheel alignment of a vehicle equipped with wheels having tyres coupled to respective rims, comprising the following steps:
- in a longitudinal movement of the vehicle in a forward travel direction with at least one of the wheels positioned in contact with a longitudinal track, until the wheel surmounts a measuring platform located along the track, acquiring a forward travel measurement signal, representing a lateral force applied to the platform and directed transversely to both the longitudinal direction and the weight force at a forward travel instant at which the wheel surmounts the measuring platform as it moves along the track in the forward travel direction;
- in a longitudinal movement of the vehicle in a return travel direction opposite to the forward travel direction with the wheel positioned in contact with the longitudinal track, until the wheel surmounts the measuring platform, acquiring a return travel measurement signal, representing a lateral force applied to the platform and directed transversely at a return travel instant at which the wheel surmounts the measuring platform as it moves along the track in the return travel direction;
- processing the forward and return measurement signals in order to determine, for the wheel, at least an angle of camber and/or toe, wherein processing comprises a step of cancelling a contribution of the angle of wheel toe to the lateral force by comparing the forward and return travel measurement signals.

* * * * *